F. M. WEGNER.
TIRE FOR AUTOMOBILE WHEELS.
APPLICATION FILED DEC. 7, 1918.

1,302,741.

Patented May 6, 1919.
2 SHEETS—SHEET 1.

Inventor
Ferdinand M. Wegner
By his Attorney
Israel Benjamins.

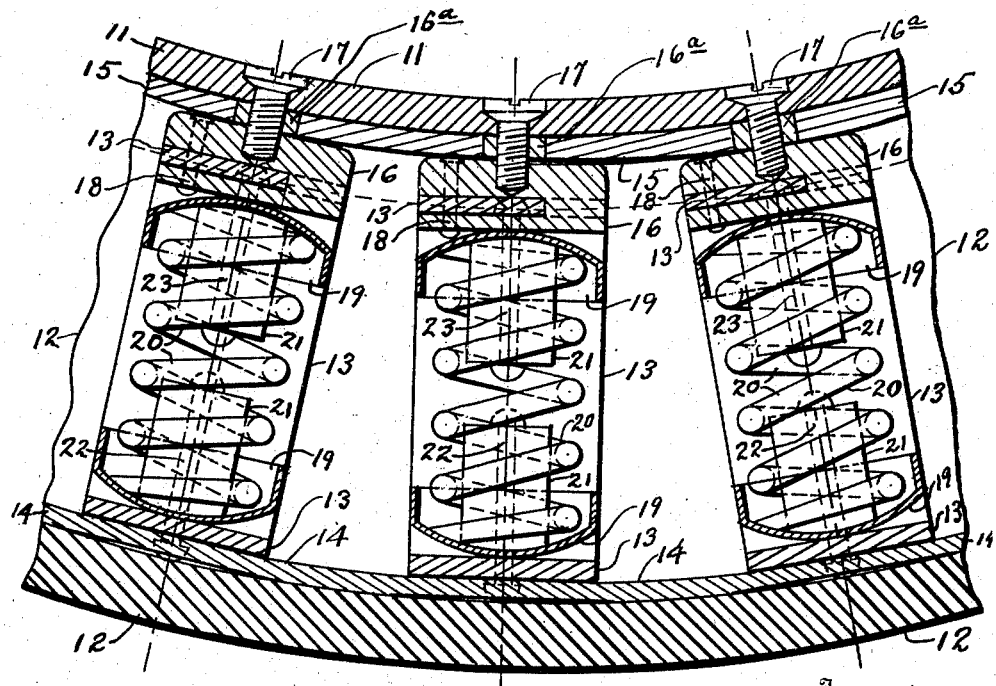

UNITED STATES PATENT OFFICE.

FERDINAND M. WEGNER, OF BROOKLYN, NEW YORK.

TIRE FOR AUTOMOBILE-WHEELS.

1,302,741.  Specification of Letters Patent.  Patented May 6, 1919.

Application filed December 7, 1918. Serial No. 265,771.

*To all whom it may concern:*

Be it known that I, FERDINAND M. WEGNER, a citizen of the United States, residing at 53 Vernon Ave., Brooklyn, in the county of Kings and State of New York, have invented a new and useful Tire for Automobile-Wheels, of which the following is a specification.

My invention relates to improvements in tires for automobile wheels in which springs are employed for cushioning the tires instead of pneumatic tubes, and it consists in the novel features hereinafter more fully described.

The objects of my improvement are:

First, to produce a spring cushioned tire for automobile wheels that is practical and efficient.

Second, to have said tire simple, durable and inexpensive; and

Third, to have the springs of said tire connected into a single unit, so as to be easily handled and to have said unit inclosed by the shoe of the automobile wheel.

I attain these objects by the tire illustrated in the accompanying drawings or by any mechanical equivalent or obvious modification of the same.

In the drawings Figure 1 is a side elevation of the tire, including the wearing shoe and the demountable rim of the automobile wheel, and showing in dotted lines the spring casings inclosed between said shoe and demountable rim.

Fig. 3 is a section on the line C—D of Fig. 2, but on a larger scale and containing only a small part of the periphery of the tire; the springs and rubber blocks are shown in Fig. 3 in elevation.

Similar numerals and letters refer to similar parts throughout the several views.

11 designates the demountable rim of the automobile wheel, and 12 the shoe of the same.

Figure 1:
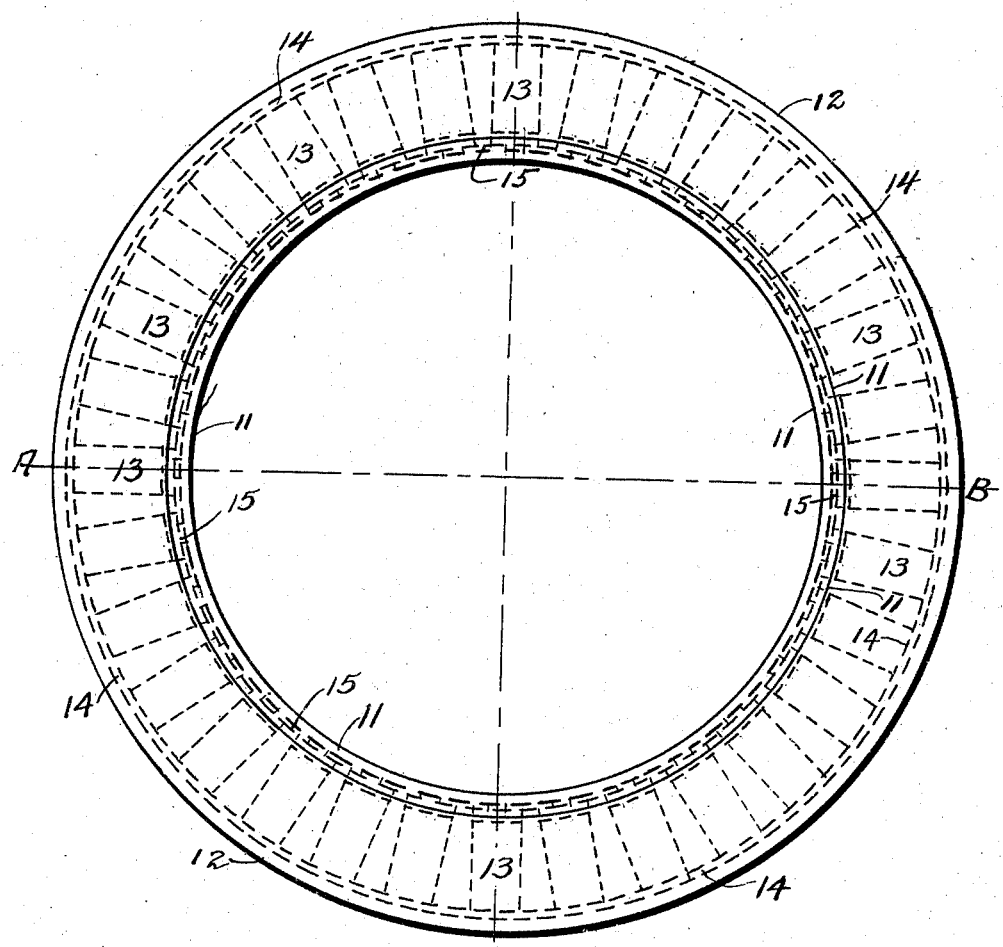
Figure 2:
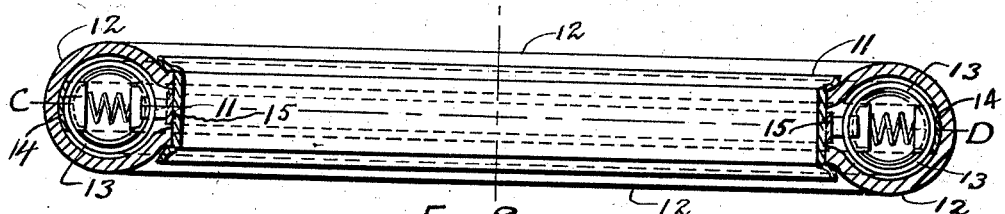
Fig. 2 is a section on the line A—B of Fig. 1, showing the springs and spring casings in elevation.

13, 13 designate the spring casings preferably made of leather and formed into a ring reinforced on the inside and adapted to be encompassed by said shoe 12, as shown in Fig. 2.

On the side nearest to said demountable rim 11 said casings 13 are shown as having each a yoke 16, connected thereto by means of a suitable rivet 18; part of the leather of each casing is cut away to make room for said yoke 16, as shown in dotted lines at the right end of each yoke in Fig. 3.

Said yokes 16 have each a head 16$^a$ adapted to fit an opening in the inner spacing belt 15 and to receive the screw 17 which connects the same to said demountable rim 11, thereby securing said casings 13 in position inside of said shoe 12.

Each of said casings 13 is shown in Fig. 3 as inclosing a compression spring 20, which is kept in position by a pair of caps 19, one at each end of said spring 20, and the action of the spring is limited by a pair of blocks 21, situated one at each end of said spring.

Said blocks 21 and said caps 19 are secured to said casings 13 by means of the rivets 22 and 23, the rivets 22 serving also to secure said casings to the outer spacing belt 14.

Said belts 15 and 14 may be made preferably of leather, and said blocks 21 of live rubber.

Said outer spacing belt 14 with the spring casings 13 connected thereto and the inclosed springs 20 form the inner member or cushion of my tire for automobile wheels; the inner spacing belt serves to facilitate the connecting of said spring casings 13 to said demountable rim 11 by bringing said heads 16$^a$ with their tapped openings opposite to the corresponding screw openings of said rim 11.

Many changes could be made in my tire for automobile wheels without departing from the main scope of my invention; I do not, therefore, restrict myself to the details of construction of my tire as shown in the drawings; but I intend to include also all mechanical equivalents and reasonably obvious modifications of the same.

What I claim as my invention and desire to secure by Letters-Patent, is:

1. In combination with a demountable rim, a tire for automobile wheels comprising a shoe, helical springs, ring casings inclosing the same, said casings being situated between the demountable rim and the shoe of the wheel, means for keeping said springs in position in said casings, an outer spacing belt secured to said casings, an inner spacing belt, yokes connected to said casings, heads on said yokes adapted to engage suitable openings in said inner spacing belt, and means for securing said heads to the demountable rim of the automobile wheel.

2. In combination with a demountable rim, a tire for automobile wheels comprising a shoe, helical springs, casings inclosing the same, said casings being situated between the demountable rim and the shoe of the wheel, means for keeping said springs in position in said casings, an outer spacing belt secured to said casings, an inner spacing belt, yokes connected to said casings, means for detachably connecting said yokes to said inner spacing belt and means for securing said yokes to the demountable rim of the automobile wheel.

3. In combination with a demountable rim, a tire for automobile wheels comprising a shoe, helical springs, casings inclosing the same, said casings being situated between the demountable rim and the shoe of the wheel, means for keeping said springs in position in said casings, an outer spacing belt secured to said casings, an inner spacing belt, means for connecting said casings to said inner belt and means for securing said casings to the demountable rim of the automobile wheel.

4. In combination with a demountable rim, a tire for automobile wheels comprising a shoe, helical springs, casings inclosing the same, said casings being situated between the demountable rim and the shoe of the wheel, means for keeping said springs in position in said casings, a spacing belt secured to said casings and means for securing said casings to the demountable rim of the automobile wheel.

5. In combination with a demountable rim, a tire for automobile wheels comprising a shoe, helical springs, casings inclosing the same, said casings being situated between the demountable rim and the shoe of the wheel, means for keeping said springs in position in said casings and means for securing said casings to the demountable rim of the automobile wheel.

6. In combination with a demountable rim, a tire for automobile wheels comprising a shoe, helical springs, casings inclosing the same, said casings being situated between the demountable rim and the shoe of the wheel, means for securing said casings to the demountable rim and live rubber blocks adapted to limit the action of said springs.

FERDINAND M. WEGNER.

Copies of this patent may be obtained for five cents each, by addressing the "Commissioner of Patents, Washington, D. C."